United States Patent
George (10) Patent No.: US 11,970,800 B2
(45) Date of Patent: Apr. 30, 2024

(54) NONWOVEN HEMP FIBER-BASED MATERIALS

(71) Applicant: Thomas Jefferson University, Philadelphia, PA (US)

(72) Inventor: Brian R. George, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 11 days.

(21) Appl. No.: 15/733,793

(22) PCT Filed: Apr. 26, 2019

(86) PCT No.: PCT/US2019/029440
§ 371 (c)(1),
(2) Date: Oct. 26, 2020

(87) PCT Pub. No.: WO2019/210230
PCT Pub. Date: Oct. 31, 2019

(65) Prior Publication Data
US 2021/0262132 A1    Aug. 26, 2021

Related U.S. Application Data

(60) Provisional application No. 62/663,652, filed on Apr. 27, 2018.

(51) Int. Cl.
*D04H 1/4382* (2012.01)
*D04H 1/425* (2012.01)

(52) U.S. Cl.
CPC ......... *D04H 1/43835* (2020.05); *D04H 1/425* (2013.01); *D04H 1/43828* (2020.05); *D04H 1/43832* (2020.05)

(58) Field of Classification Search
CPC ............ B01D 39/1615; B01D 39/1623; B01D 2239/064
See application file for complete search history.

(56) References Cited

U.S. PATENT DOCUMENTS

| 3,959,556 A | 5/1976 | Morrison |
| 5,328,759 A | 7/1994 | McCormack et al. |
| 7,918,313 B2 | 4/2011 | Gross et al. |

FOREIGN PATENT DOCUMENTS

| CN | 104005105 A | 8/2014 |
| EP | 3009551 A1 | 4/2016 |

OTHER PUBLICATIONS

"International Search Report issued in International Application No. PCT/US2019/029440 dated Jul. 5, 2019", Jul. 5, 2019.

*Primary Examiner* — Lynda Salvatore
(74) *Attorney, Agent, or Firm* — Riverside Law LLP

(57) ABSTRACT

A hemp-based nonwoven material manufactured by an air bonding process comprising a temperature of 150° C. for two minutes; said nonwoven material comprising between 1% and 99% hemp and between 1% and 99% of at least a second fiber; wherein the at least a second fiber is a synthetic fiber having a melt temperature of above 150° C.

9 Claims, 2 Drawing Sheets

FIGURE 2

NONWOVEN HEMP FIBER-BASED MATERIALS

CROSS-REFERENCE TO RELATED APPLICATIONS

This application is a 371 National Phase Entry of International Patent Application No. PCT/US2019/029440 filed on Apr. 26, 2019, which claims the benefit of U.S. Provisional Patent Application No. 62/663,652 filed on Apr. 27, 2018, with the United States Patent and Trademark Office, the contents of which are incorporated herein by reference in their entirety.

FIELD OF THE INVENTION

The present application is generally related to nonwoven fiber-based materials having improved absorbent and other mechanical properties relevant for consumer and industrial products.

BACKGROUND OF THE INVENTION

Fibers are grown throughout the world for their use in making textiles. The history of fiber production is nearly as old as recorded time, with the first recorded fibers at nearly 5000 BC. Fibers are typically produced from either vegetative fibers or animal protein fibers. Vegetative fibers include cotton, linen, and jute, among others. Animal protein fibers typically include wools and silk materials. These materials are frequently time intensive to grow, clean, and then process to form a strand suitable for making textiles. One of the key aspects is the growing process, requiring both ample space, heavy amounts of fertilizer, herbicides, and pesticides to grow a sufficient crop, and then significant man or machine power for processing.

For many years, cotton has reigned as king of the vegetative fibers, and the invention of the cotton gin dramatically increased the rate of collection and thus enabled an increase in cultivation. Today, cotton is ubiquitously used in clothing, when natural fibers are called upon, however cotton is not suitable for worldwide growth and it can be a resource heavy plant and thus unsuitable for certain locations.

However, the source of fibers, throughout time, still comes down to some vegetative source. Wood provides the most common plant fibers, and is the raw material for regenerated cellulose fibers, but wood fibers are frequently too short for textile processing (unless paper is regarded as a wet-laid nonwoven textile). Kapok, which is a hollow fiber used for buoyancy, is a seed fiber, and the coarse fiber coir, from the outer coat of the coconut, is a fruit fiber, but both have limited textile usage. Apart from cotton, the main textile plant fibers are extracted from stems (bast fibers) (e.g. flax, sunn hemp, true hemp, jute, kenaf, ramie) or stiff leaves (leaf fibers) (e.g. abaca [Manila hemp], sisal, henequen, *phormium tenax* [New Zealand flax]). At different times and locations, fibers from many other plants have been used. Currently, there is interest in promoting the use of waste products, such as pineapple fiber. The bast fibers were once of major importance, particularly before the supply of cotton from America, for clothing and other textiles; and the leaf fibers were dominant in ropes and cordage. However, with the additional competition from manufactured fibers, their use is now limited. The lower cost fibers have inferior properties, and the superior fibers are expensive to produce.

Bast and leaf fibers are multicellular. The fibers are small and short, but in bundles they provide the reinforcement to stems and leaves. Extraction of the fibers starts with retting, which is a biological or chemical attack on the nonfibrous tissues and is followed by mechanical beating and further textile processing. The size of the fibers, as they are used in yarns and fabrics, depends on the severity of the treatments. The helix angle in these fibers is lower than in cotton, typically around 10°, so that when, as in flax and ramie, they are almost pure cellulose, they have greater strength and lower break extensions than cotton. Other fibers, such as jute, contain substantial fractions of noncellulosic material, lignans, and hemicelluloses, which lower strength and break extension.

Flax, which is used to make linen, and ramie are high quality fibers with good color and an attractive appearance and handle in fabrics. Jute was widely used for low grade uses, such as sacking and carpet backing, but, in developed markets, has lost out to polypropylene. Trials for other uses are being made in jute-producing countries. In cordage, abaca and sisal were dominant, but have been replaced by synthetic fibers.

Accordingly, new cellulosic-based materials are needed to enable generation of new nonwoven materials, specifically materials comprising fibrous (bast) materials from the *Cannabis* sp. plant, wherein processing of the fibrous bast material and collection of fibers is energy efficient, carbon negative, and sustainable.

SUMMARY OF THE INVENTION

In a preferred embodiment, a hemp-based nonwoven material comprising a first hemp material in a quantify of between 1% and 100% total weight of the nonwoven material; wherein said material is formed via air-laid, carding, or wet-laid, and can be bonded via hydroentanglement, needle punching, or adhesive bonding.

In a further preferred embodiment, the hemp-based nonwoven material comprising at least a second material in a quantity of between 1% and 99% total weight of the nonwoven material.

In a further preferred embodiment, wherein said second material having a melt point between 100° C. and 200° C. In a further embodiment, wherein the second material is a low melt synthetic fiber, wherein the synthetic fiber comprises a core and a sheath. In a further embodiment, wherein the core is a polyester and the sheath is a polyolefin. In a further embodiment, wherein the second material is a high melt temperature. In a further embodiment, wherein the second material is a low melt temperature material.

In a further preferred embodiment, wherein the second material is selected from the group consisting of: polyester, nylon, polyethylene, polypropylene, cotton, flax, jute, ramie, and other fibrous materials, or combinations thereof.

In a further preferred embodiment, a hemp-based nonwoven material comprising between 1% and 100% of hemp fibers; wherein said hemp fibers are saturated with a solvent and blended; wherein said solvent and fibers are filtered; and wherein the fibers can be processed into nonwoven materials via air-laid, carding, and wet-laid, and bonded via hydroentanglement, needle punching, or adhesive bonding. In a further embodiment, the nonwoven material comprising at least a second material; said second material in a quantity of between 1% and 99% total weight of the nonwoven material. In a further embodiment, the nonwoven material wherein said second material having a melt point between 100° C. and 200° C. In a further embodiment, the nonwoven material wherein the second material is selected from the group consisting of: polyester, nylon, polyethylene, polypropylene, cotton, flax, jute, ramie, and other fibrous materials, or combinations thereof.

In a further embodiment, the hemp-based nonwoven material which is a geotextile, blue roof media, growing medium, acoustic insulation, thermal insulation, absorbent material, wipe, or interior wall and ceiling panels. In a further embodiment, the hemp-based nonwoven material having a basis weight of 1 to 1000 grams per square meter.

In a further embodiment, the hemp-based nonwoven material comprising a second material wherein the second material is a low melt synthetic fiber, wherein the synthetic fiber comprises a core and a sheath. In a further preferred embodiment, the hemp-based nonwoven material wherein the second material is a high melt temperature. In a further embodiment, wherein the second material is a low melt temperature material.

In a further preferred embodiment, the hemp-based nonwoven material the material comprises a liquid absorptive capacity of at least 900%.

In a further preferred embodiment, the hemp-based nonwoven material wherein the material comprises a sound absorptive coefficient of at least 0.10 for frequencies above 1000 Hz.

In a further preferred embodiment, the hemp-based nonwoven material wherein the core is a polyester and the sheath is a polyolefin.

In a further preferred embodiment, the hemp-based nonwoven material wherein the nonwoven material is impregnated with a third component. In a further preferred embodiment, the hemp-based nonwoven material wherein the third component is a natural or synthetic material having antibacterial properties.

In a further preferred embodiment, a hemp-based nonwoven material manufactured by an air bonding process comprising a temperature of 150° C.; said process comprising blending a portion of hemp fiber with a solvent; filtering the solvent from the hemp fiber; and air bonding said material to form the nonwoven material.

In a further embodiment, the nonwoven material further comprising at least a second fiber, said second fiber blended with the portion of hemp fiber; wherein said nonwoven material comprises between 1% and 99% hemp and between 1% and 99% of at least said second fiber. In a further embodiment, the nonwoven material wherein the at least a second fiber is a synthetic fiber having a melt temperature of between 110° C. and 150° C. In a further embodiment, the nonwoven material wherein the second fiber contains an inner core and an outer sheath, with the inner core having a different melt temperature than the outer sheath. In a further embodiment, the nonwoven material wherein the second fiber's inner core has a melt temperature of between 110° C. and 150° C. and the outer sheath has a lower melt temperature than the inner core. In a further embodiment, the nonwoven material wherein the second fiber's inner core has a higher melt temperature than the outer sheath. In a further embodiment, the nonwoven material wherein the air bonding process is performed for 2 minutes or less at a temperature of 150° C. In a further embodiment, the nonwoven material wherein the core is a polyester and the sheath is a polyolefin.

In a further preferred embodiment, a hemp-based nonwoven material manufactured by an air bonding process comprising a temperature of less than 150° C.; said nonwoven material comprising between 1% and 99% hemp and between 1% and 99% of at least a second fiber; wherein the at least a second fiber is a synthetic fiber having a melt temperature of above 150° C. In a further embodiment, the process wherein the second fiber contains an inner core and an outer sheath, with the inner core having a different melt temperature than the outer sheath. In a further embodiment, the process wherein the second fiber inner core has a melt temperature above 150° C., and an outer sheath having a melt temperature below 150° C. In a further embodiment, the process wherein the outer sheath of the second fiber is less than the temperature of the air bonding process.

In a further preferred embodiment, a hemp-based nonwoven material manufactured by an air bonding process comprising a temperature of 150° C. for two minutes; said nonwoven material comprising between 1% and 99% hemp and between 1% and 99% of at least a second fiber; wherein each of the hemp and the at least a second fiber are impregnated with a natural or synthetic material. In a further preferred embodiment, the process wherein said second fiber is a natural fiber. In a further embodiment, the process wherein said second fiber is a synthetic fiber. In a further embodiment, the process wherein the natural material is an oil. In a further embodiment, the process wherein the oil imparts antimicrobial, antibacterial, or water resistance. In a further embodiment, the process wherein the synthetic material is a chemical suitable for imparting fire resistance, antimicrobial, antibacterial, increasing hydrophobicity of the fibers to prevent moisture, or imparted with a suitable cleaning agent or cosmetic agent. In a further embodiment, the process wherein the hemp fiber has a different absorbent property than the second fiber, and wherein the hemp fiber is impregnated with a first material and the second fiber is impregnated with a second material. In a further embodiment, the process comprising at least a third fiber.

In a further preferred embodiment, a hemp-based nonwoven material manufactured by a bonding process comprising heating a hemp-based fiber and at least a second fiber at a sufficient temperature to bind the fibers; said nonwoven material comprising between 1% and 99% hemp and between 1% and 99% of at least a second fiber.

In a further preferred embodiment, the hemp-based nonwoven material wherein the hemp-based nonwoven web is produced by carding, air-laid, or wet-laid web forming methods. In a further embodiment, wherein the hemp-based nonwoven material is manufactured as a fabric produced by thermal or adhesive bonding, hydroentangling, or needle punching.

In a further preferred embodiment, the hemp-based nonwoven material, which is a geotextile, blue roof media, growing mediums, acoustic insulation, thermal insulation, absorbency, wipes, or interior wall and ceiling panels. In a further preferred embodiment, the hemp-based nonwoven material having a basis weight of 1 to 1000 grams per square meter.

In a preferred embodiment, a hemp-based nonwoven material manufactured by an air-laid web forming process and a thermal bonding process comprising a temperature of 150° C. for two minutes; said nonwoven material comprising between 1% and 99% hemp and between 1% and 99% of at least a second fiber; wherein the at least a second fiber is a synthetic fiber having a melt temperature of between 110° C. and 275° C., with a preferred range of 110° C. to 150° C. In a preferred embodiment, the synthetic fiber contains an inner core and an outer sheath, with the inner core having a different melt temperature than the outer sheath.

In a preferred embodiment, a hemp-based nonwoven material manufactured by an air bonding process comprising a temperature of 150° C.; said nonwoven material comprising between 1% and 99% hemp and between 1% and 99% of at least a second fiber; wherein the at least a second fiber is a synthetic fiber having a melt temperature of between 110° C. and 150° C. In a preferred embodiment, wherein the second fiber contains an inner core and an outer sheath, with the inner core having a different melt temperature than the outer sheath. In a preferred embodiment, wherein the second fiber's inner core has a melt temperature of between 110° C. and 150° C. and the outer sheath has a lower melt temperature than the inner core. In a preferred embodiment, wherein the second fiber's inner core has a higher melt temperature than the outer sheath. In a preferred embodiment, wherein the air bonding process is performed for 2 minutes or less at a temperature of 150° C. In a preferred embodiment, wherein the core is a polyester and the sheath is a polyolefin.

A further preferred embodiment is directed toward a hemp-based nonwoven material manufactured by an air bonding process comprising a temperature of less than 150° C.; said nonwoven material comprising between 1% and 99% hemp and between 1% and 99% of at least a second fiber; wherein the at least a second fiber is a synthetic fiber having a melt temperature of above 150° C.

In a further embodiment, the hemp-based nonwoven material wherein the second fiber inner core has a melt temperature above 150° C. In a further embodiment wherein the second fiber inner core has a melt temperature below 150° C. In a further embodiment, the hemp-based nonwoven material wherein the outer sheath of the second fiber is less than the temperature of the air bonding process.

In a further preferred embodiment, a hemp-based nonwoven material manufactured by an air bonding process comprising a temperature of 150° C. for two minutes; said nonwoven material comprising between 1% and 99% hemp and between 1% and 99% of at least a second fiber; wherein each of the hemp and the at least a second fiber are impregnated with a natural or synthetic material. In a further embodiment, the hemp-based nonwoven material wherein said second fiber is a natural fiber. In a further embodiment, the hemp-based nonwoven material wherein said second fiber is a synthetic fiber.

In a further embodiment, the hemp-based nonwoven material wherein the natural material is an oil. In a further embodiment, wherein the oil imparts antimicrobial, antibacterial, or water resistance.

In a further embodiment, the hemp-based nonwoven material wherein the synthetic material is a chemical suitable for imparting fire resistance, antimicrobial, antibacterial, increasing hydrophobicity of the fibers to prevent moisture, or imparted with a suitable cleaning agent or cosmetic agent.

In a further embodiment, the hemp-based nonwoven material wherein the hemp fiber has a different absorbent property than the second fiber, and wherein the hemp fiber is impregnated with a first material and the second fiber is impregnated with a second material. In a further embodiment, the hemp-based nonwoven material comprising at least a third fiber.

A hemp-based nonwoven material manufactured by a bonding process comprising heating a hemp-based fiber and at least a second fiber at a sufficient temperature to bind the fibers; said nonwoven material comprising between 1% and 99% hemp and between 1% and 99% of at least a second fiber.

A hemp-based nonwoven material manufactured by a bonding process comprising chemically binding a hemp-based fiber and at least a second fiber to bind the fibers; said nonwoven material comprising between 1% and 99% hemp and between 1% and 99% of at least a second fiber.

A hemp-based nonwoven material manufactured by a bonding process selected from the group consisting of: thermal bonding, adhesive bonding, hydroentangling, or needle punching wherein the bonding comprise bonding a first hemp fiber and at least a second fiber to bind the fibers; said nonwoven material comprising between 1% and 99% of the first hemp fiber and between 1% and 99% of at least a second fiber.

A further embodiment is directed toward a hemp-based nonwoven material manufactured by an air bonding process comprising a temperature of 150° C. for two minutes; said nonwoven material comprising between 1% and 99% hemp and between 1% and 99% of at least a second fiber; wherein each of the hemp and the at least a second fiber are impregnated with a natural or synthetic material. In various embodiments, wherein said second fiber is a natural fiber or a synthetic fiber. In preferred embodiments, wherein the natural material is an oil. In preferred embodiments, wherein the oil imparts antimicrobial, antibacterial, or water resistance (hydrophobic, to prevent water inundation of the fibers). In embodiments comprising a synthetic material, wherein the synthetic material is a chemical suitable for imparting fire resistance, antimicrobial, antibacterial, increasing hydrophobicity of the fibers to prevent moisture, or imparted with a suitable cleaning agent or cosmetic agent.

In preferred embodiments, nonwoven materials comprise wherein the hemp fiber has a different absorbent property than the second fiber, and wherein the hemp fiber is impregnated with a first material and the second fiber is impregnated with a second material. In preferred embodiments, a nonwoven material comprising at least a third fiber.

An embodiment of manufacturing a hemp-based nonwoven material manufactured by a bonding process comprising heating a hemp-based fiber and at least a second fiber at a sufficient temperature to bind the fibers; said nonwoven material comprising between 1% and 99% hemp and between 1% and 99% of at least a second fiber.

An embodiment of manufacturing a hemp-based nonwoven material manufactured by a bonding process comprising chemically binding a hemp-based fiber and at least a second fiber to bind the fibers; said nonwoven material comprising between 1% and 99% hemp and between 1% and 99% of at least a second fiber.

An embodiment of manufacturing a hemp-based nonwoven material manufactured by a bonding process selected from the group consisting of: thermal bonding, adhesive bonding, hydroentangling, or needle punching wherein the bonding comprise bonding a first hemp fiber and at least a second fiber to bind the fibers; said nonwoven material comprising between 1% and 99% of the first hemp fiber and between 1% and 99% of at least a second fiber.

A process for manufacturing a hemp-based nonwoven material comprising: adding a portion of hemp fibers to a portion of a second fiber; air bonding the hemp fibers to the second fiber under a temperature sufficient to bonding the materials together into a nonwoven-based material.

DETAILED DESCRIPTION OF THE INVENTION

A primary benefit of hemp plants is their ability to grow rapidly in a wide variety of soils and temperatures. For example, hemp grows in inhospitable areas, is resilient to weed ingrowth, does not require the use of pesticides or herbicides and requires little fertilizer or water to thrive. Hemp can also be utilized to assist in clearing or resting a field, between higher energy/nutrient uptake crops, such as soy and corn. Ultimately, hemp functions as a carbon negative plant, making it highly attractive for use. Yet, our foundational studies, as described herein, allow for not simply exchange of hemp material for those of cotton or other fibers, but the hemp materials have improved certain properties which make the use of the material even more exciting.

Indeed, these very properties make hemp an exciting alternative to cotton. Because of hemps rapid growth and ability to grow in less than ideal conditions, as compared to other common cellulosic fiber providers such as cotton and trees used to produce rayon, it can be grown and sourced locally as an ingredient in nonwoven fabrics. Indeed, a significant benefit to such growth is the local propagation of these cellulosic sources, rather than import fibers or finished products from other countries, thereby reducing the energy expenditure and costs associated with shipping raw or finished products far from their ultimate consumption location.

Key Characteristics of the Hemp Plant

The average hemp plant grows to a height of between six (6) feet to sixteen (16) feet and matures in approximately seventy (70) to one hundred ten (110) days. A hemp crop has the potential of yielding 3-8 tons of dry stalks per acre per harvest. Hemp, like many dicotyledonous plants contains a phloem and fibers around the phloem. Hemp is no different and contains both a fiber (bast fiber) as well as a hurd portion (adjacent to the phloem). The fibers are separated from the hurd by mechanical (for example, decortication), or chemical action, and the fibers can then be used for any fiber materials, including textiles like carpet, yarn, rope, netting, matting, insulation, and the like. Further uses of hemp fibers include personal hygiene products, wipes, filters, absorbent materials, as well as for certain filtration and industrial applications including insulation and acoustic properties.

Characteristics of Hemp Fiber

The hemp fibers themselves have favorable characteristics besides their use in textiles. They require fewer chemicals to convert the fibers to a "pulp" when compared to trees, and the long fibers can create high quality paper that requires less bleaching than traditional paper made from wood pulp. Less chemical and bleaching usage results in a decrease of chemical byproducts while at the same time producing a superior paper product that does not "yellow" with age. Processing the pulp uses between 80-135 gallons of water for two pounds of dry hemp. The overall process is carbon negative removing more $CO_2$ from the environment than it makes when being produced. The short fibers can also be utilized as packaging material, or in nonwoven applications, which are specifically described herein.

Processes of Producing Nonwoven Hemp Fibers

Hemp fibers are generated from hemp stalk. Manual or chemical processing separates the fibers from the rest of the stalk, and these fibers can be cleaned for subsequent use. The fibers are then blended with a copolyester bicomponent fiber, commonly used for thermal bonding of nonwoven fabrics, although other bicomponent or thermoplastic fibers could be utilized. The blend ratios of hemp to polyester were 25%:75%, 50%:50%, and 75%:25%.

The nonwoven material comprises a web of fibers bonded to one another. The webs were formed through the air-laid process using a Rando Webber. Webs could also be formed via wet-laid and carding methods. The webs were bonded through air bonding at 150° C. for 2 minutes, although other time and temperature combinations may be used to achieve bonding of bicomponent fibers. Alternative methods of bonding the materials include hydroentangling, needle punching, and latex or adhesive bonding.

A particular application comprises a polyester fiber and a hemp fiber, with ratios of each fiber between 25-75% for a variety of materials produced. The fibers are air-laid and then bonded at 150° C. for about 2 minutes. This temperature is sufficient to allow for the polymer to reach a melting temperature, without it turning into a liquid, which allows for the polymer and the hemp fiber to physically bond together.

Applications for Nonwoven Hemp

When formatted with high percentages of hemp fibers, the materials have a high absorptive property. For example, such materials can be utilized in applications focused on spill clean ups like mop head replacements or countertop cleaners and other wipe applications. Certainly, larger industrial spill applications are also suitable. For example, the oil and gas industry for certain spills, or for the automotive or simple industrial machine shops all used absorbent materials for containing and remedying spills. Materials, using the hemp fibers, show increased absorptive properties suitable for such applications as compared to paper towels. However, a significant benefit of the fiber-based materials, as compared to pulp cellulose-based materials is an increase in tensile strength, due to the interaction of the fibers.

Numerous absorbent paper products advertise their increased strength, even when wet. This is because when paper materials are wet, they quickly tear and lose strength. The fiber-based nonwoven material, because of the entanglement of the fibers together has incredible strength, as compared to a standard paper product, yet retains the significant absorbency of the paper product, and is disposable and biodegradable. Indeed, the use of certain biodegradable polymer, such as PLA, allow for a product that has tremendous strength yet retains its biodegradable nature. PLA, as known to those of ordinary skill in the art is derived from renewable biomass and has a melting point of between 150-160° C. Accordingly, as with any optimization, the specific polymer (or polyester as PLA is technically a polyester), will necessitate the specific binding temperature of the nonwoven material.

In certain embodiment, the nonwoven hemp fibers are manufactured in such a percentage with additional natural or synthetic fibers so as to generate significant sound absorbing or dampening properties. For example, such materials are currently used for acoustic wall or ceiling tiles in office spaces, home spaces, automotive, and industrial applications. Such materials, therefore, would be suitable for replacement in such spaces, but also for generating portable paneling materials. Currently a blend of kenaf and bicomponent fibers is used to create an acoustical fabric for automotive applications. We can exchange the kenaf with hemp fibers and obtain similar properties in terms of thickness, basis weight, strength, and acoustical absorption while using a sustainable and reproducible material. However, these materials are often lighter in weight but maintain the same or even greater strength than the kenaf fibers.

Hemp Fiber Production

Hemp fibers were blended with copolyester sheath core bicomponent fibers in blends of 75/25 polyester/hemp, 50/50 polyester/hemp, and 25/75 polyester/hemp and formed into fibrous webs with a Rando Webber air-laid unit. The webs were bonded with a through air oven set at 150° C. with a bonding time of two minutes.

The basis weight was determined by cutting squares with edges measuring 10.2 cm in length from various parts of the fabrics, weighing, and dividing mass by fabric area to arrive at the basis weight in terms of grams per square meter (gsm). Liquid Absorptive Capacity (LAC) was based on a modified IST 10.1-92 test method, where the nonwoven fabric squares, 10.2 cm in length per side, were weighed and then were attached to an aluminum screen of a similar size with two clips and immersed in water for 1 minute. After the 1-minute immersion time the fabric and screen were removed from the water and allowed to drain for 2 minutes. The wet weight was then measured and the LAC was calculated by subtracting the dry weight from the wet weight, dividing that number by the dry weight, and then multiplying by 100%. Thickness was measured by using a ruler on the uncompressed flat fabric.

Table 1 details the hemp nonwoven fabric absorptive capacity for the three different materials.

TABLE 1

| Specimen | Thickness (mm) | Basis Weight (gsm) | Liquid Absorptive capacity (%) | LAC/ Thickness (%/mm) |
|---|---|---|---|---|
| 75/25 PET/Hemp | | | | |
| Average | 8.20 | 337.40 | 1441.14 | 183.52 |
| St Dev | 1.79 | 32.82 | 127.60 | 50.97 |
| 50/50 PET/Hemp | | | | |
| Average | 6.40 | 290.60 | 962.18 | 153.37 |
| St Dev | 1.14 | 23.36 | 174.71 | 34.14 |
| 25/75 PET/Hemp | | | | |
| Average | 5.80 | 293.00 | 950.19 | 169.33 |
| St Dev | 1.30 | 44.92 | 66.11 | 33.82 |

The data indicates that the LAC values of the fabric decrease with the increase of hemp, however, when the normalizing factor of fabric thickness is used to determine the LAC per mm of thickness the data indicates that the LAC values are within one standard deviation of each other when thickness is considered, indicating that absorptive capacity of the fabric is not greatly altered by increasing the amount of hemp in the fabric.

When tested for sound absorption using a standard sound absorption testing machine, the results were as given in the following table and chart.

TABLE 2

| | Sound Absorptive Coefficient | | |
|---|---|---|---|
| Frequency (HZ) | 75/25 PET/Hemp | 50/50 PET/Hemp | 25/75 PET/Hemp |
| 250 | 0.03 | 0.04 | 0.04 |
| 500 | 0.05 | 0.07 | 0.06 |
| 750 | 0.07 | 0.09 | 0.08 |
| 1000 | 0.10 | 0.10 | 0.10 |
| 1250 | 0.12 | 0.12 | 0.12 |
| 1500 | 0.14 | 0.13 | 0.13 |
| 1750 | 0.16 | 0.13 | 0.14 |
| 2000 | 0.17 | 0.15 | 0.15 |
| 2250 | 0.19 | 0.16 | 0.16 |
| 2500 | 0.21 | 0.17 | 0.18 |
| 2750 | 0.23 | 0.18 | 0.19 |
| 3000 | 0.25 | 0.20 | 0.21 |
| 3250 | 0.28 | 0.21 | 0.22 |
| 3500 | 0.29 | 0.23 | 0.24 |
| 3750 | 0.31 | 0.25 | 0.26 |
| 4000 | 0.33 | 0.26 | 0.28 |
| 4250 | 0.35 | 0.28 | 0.30 |
| 4500 | 0.37 | 0.29 | 0.31 |
| 4750 | 0.38 | 0.30 | 0.32 |
| 5000 | 0.40 | 0.32 | 0.34 |
| 5250 | 0.41 | 0.33 | 0.35 |
| 5500 | 0.43 | 0.34 | 0.36 |
| 5750 | 0.45 | 0.36 | 0.38 |
| 6000 | 0.46 | 0.37 | 0.39 |
| 6250 | 0.48 | 0.38 | 0.41 |

Figure 1:
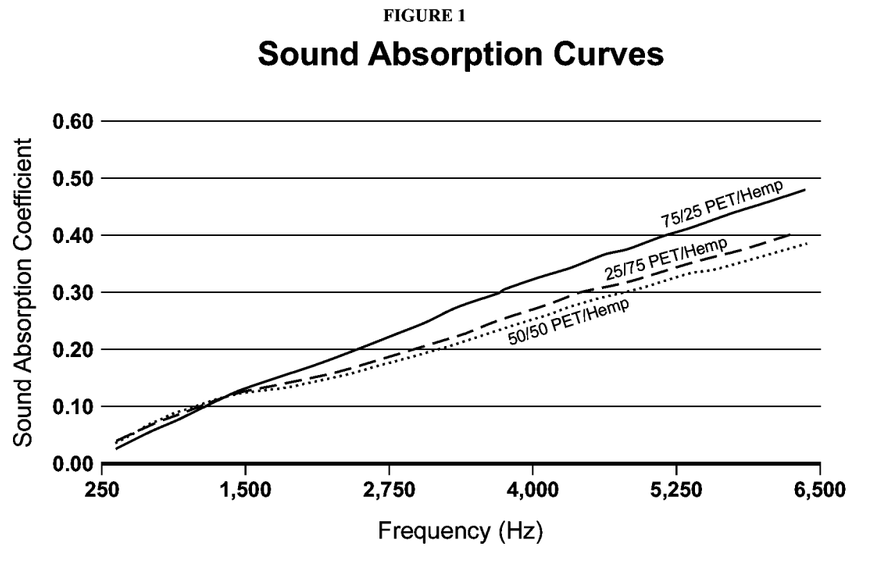
FIG. 1 details a sound absorption curves for three variations of PET and hemp fiber materials.

FIG. 1 details that the sound absorption test results indicate that there is some difference in the absorption of sound across various frequencies, but the 75/25 PET/Hemp fabric was thicker than the other two fabrics, thus influencing sound absorption which is influenced by fabric thickness.

Overall, testing indicates that the fabrics could be used for sound absorption or liquid absorbing applications.

Therefore, with regard to commercial embodiments, the materials and the properties of the materials are suitable for replacing certain cellulose-based materials, such as cotton and rayon, because of their improved properties, as compared to them. Likewise, the hemp fibers may replace synthetic fibers such as polyester, polypropylene, polyethylene, nylon, and glass for applications where a more environmentally friendly fiber is desired. For example, some specific potential examples are:

MOP PADS (WET OR DRY): Replaceable absorbent pad for wet or dry mops. The absorbent hemp pad is wrapped around the mop head and can be disposed of and replaced in the same manner as dry dusting pads. Through the use of hemp-based fibers, the pads are ecofriendly, absorbent, retain liquid, partially or fully biodegradable depending on whether or not it is blended and what it is blended with, nontoxic, and lightweight. Indeed, such a material is highly sought in the various consumable industries, yet to date does not exist.

COUNTERTOP SPILL CLEANER: Device used to quickly soak up spills that occur on a countertop or floor. This would be disposable materials that are partially to fully biodegradable, and possibly ecofriendly. As a replacement for typical napkin or paper towels, these materials can serve as a complete replacement for paper/cellulosic-based paper products.

PORTABLE OFFICE PANEL/DIVIDER: Sound absorbing acoustic panel that can be used in home or office. The panels can be added together to form a room divider or office cubicle. This will be ecofriendly, reduce noise, enhance durability, and be easy to transport and reposition. Depending on its fiber content and finishing treatments, this may also be biodegradable.

ACOUSTIC WALL AND CEILING TILES: Individual wall tiles that can adjust the acoustics in a room. The tiles can be pressed into different patterns and arranged in any way. The use of such product is advantageous as its properties will reduce sound, they are ecofriendly, durable, and lightweight.

THERMAL INSULATION: This could be environmentally friendly insulation used in providing thermal insulation for buildings or apparel. Indeed, in home products, a typical material is synthetic fibers, usually fiberglass-based material. While the use of some paper insulation is available, these materials are underutilized. It is possible, to generate air-laid, nonwoven materials that would insulate with similar properties to fiberglass yet be ecofriendly and sustainable. Such materials, could, of course, be impregnated with suitable chemicals to impart fire resistance to the material.

One superior feature of the hemp product is that it can be impregnated with natural oils to impart natural antimicrobial properties. One such use is application of an oil comprising antifungal properties, wherein the impregnated within the material will aid in preventing the growth of mold or mildew when using these products in areas likely to grown mold or mildew, such as in areas of high moisture.

Indeed, those of ordinary skill in the art will recognize that the hemp fibers are able to be easily dipped into a solvent and the material will be absorbed by the fibers. Similarly, a second fiber, either a natural or synthetic material, can also absorb or bind to a solvent material. For example, by impregnating the fibers with another material, a portion of that material will be maintained by the fibers. Some of these materials may also bind to the natural fiber, or otherwise bind with the synthetic fibers. Some oils provide antimicrobial properties, yet others may have a pleasant aroma or may make the material more hydrophobic, while others may make the material more attractive to dust or dirt particles, for example for a cleaning material.

Therefore, it is advantageous that the hemp-based nonwoven material comprises a further natural or synthetic material to impart a further property to the nonwoven material. For example, wherein the synthetic material is a chemical suitable for imparting fire resistance, antimicrobial, antibacterial, increasing hydrophobicity of the fibers to prevent moisture, or imparted with a suitable cleaning agent or cosmetic agent.

Because of the different materials, the hemp material may interact with one material at a greater rate than a second fiber of the nonwoven material. Accordingly, in certain embodiments, wherein the hemp fiber has a different absorbent property than the second fiber, and wherein the hemp fiber is impregnated with a first material and the second fiber is impregnated with a second material.

For example, the hemp material may be generated in an aqueous solvent and used as a wipe, to be used for cleaning, make up removal, skin exfoliation, or other similar tasks. The length and natural strength of the hemp fibers, when laid in nonwoven materials provide natural strength thus making such materials highly suitable for cleaning products, even when the fibers are wet. Thus, the material retains 50%, 75%, 90%, and 95% of its tensile strength even when wet with an aqueous solvent. For nonaqueous solvents, the tensile strength may be retained when the corresponding second material in the nonwoven material is not dissolved by the nonaqueous solvent.

At the same time, processes can be utilized to make both rough surface nonwoven materials, which are suitable for grit removal or for exfoliation, or to make soft and smooth materials, suitable for gentle application to the skin. Accordingly, materials such as salicylic acid, lactic acid for cleaning, other gentle soaps, and detergents, as well as vitamin C, and other antioxidant materials can be advantageously added to or impregnated into the materials. In certain embodiments, a portion of grit, natural grit such as salt, sugar, or husk or seed fragments can be adhered to the nonwoven material to form nonwoven materials for exfoliating skin or otherwise gently abrasive.

HEAVY METAL AND ORGANIC COMPOUND ABSORPTIVE FABRICS: These fabrics can be used in conjunction with fly ash and other similar materials to absorb heavy metal and undesirable organic compounds from contaminated water.

Geotextile materials are utilized throughout the world to maintain soil and prevent erosion. Hemp-based geotextiles provide superior properties as they have increased strength and can be combined with appropriate biodegradable materials so as to provide a sufficient retaining material but ultimately degrade. Such materials have wide use as erosion control and soil stabilization materials, seed starting materials, and weed control materials.

There is also a strong market for biodegradable planting containers. Those of skill in the art will recognize that there are numerous recycled paper-based material containers on the market. Herein, use of a biodegradable polymer and hemp fibers provides a unique material that will contain the potting soil, can be temporarily coated with materials to retain moisture, but will ultimately biodegrade, so that it can be planted directly into the soil, or discarded or composted.

Blue roof fabrics are those that control the flow of water from a roofing space. These provide a temporary storage and then slow release of rainwater. The hemp fiber-based nonwoven materials can be utilized to absorb water during rain events and slowly release the water to the storm water system to avoid overloading the storm water system. Furthermore, water can be collected and then released to water capture systems where it can be utilized for irrigation or other water uses, instead of becoming water runoff.

Manufacturing and Production

Manufacture of fiber materials: Materials are obtained from a hemp grower or processor in a manner suitable to be converted into nonwoven fabrics. Materials are preferably cut and rough chopped and then processed to remove the fibers from the material. For example, the materials are retted and the fibers extracted. In certain embodiments, maintenance of fiber length can be advantageous to the finished product. However, in other embodiments, length is less material and thus any source of fibers is suitable.

Figure 2:
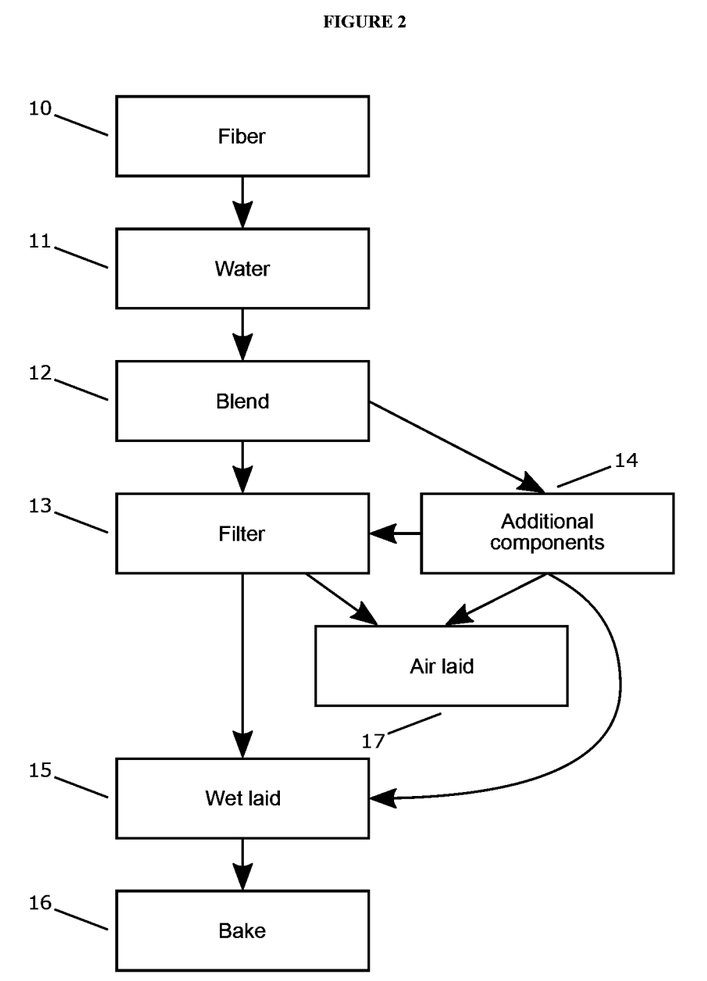
FIG. 2 details an embodiment of forming a nonwoven material.

FIG. 2 details that the fiber (10) is captured, and water (11) is added to a container, wherein the water (11) and fiber (10) are blended (12). The water (11) and fiber (10) are then filtered (13) to remove the water, and can be wet-laid (15), and then baked (16), or air-laid (17). In certain embodiments, the blending (12) may include additional components (14), which can then be filtered (13), wet-laid (15), or air-laid (17), to produce the nonwoven material.

Hemp fibers, as provided, were blended with a copolyester bicomponent. The blend ratios of hemp to polyester were 25%/75%, 50%/50%, and 75%/25%. The webs were formed through the air-laid process using a Rando Webber. The webs were bonded by through air bonding at 150° C. for 2 minutes.

Therefore, a proposed embodiment comprises manufacturing of a hemp-based nonwoven material comprising between 25% and 75% hemp and 75% to 25% polyester. Said materials are air-laid together and bonded at 150° C. for 2 minutes.

A preferred embodiment is a hemp-based nonwoven material comprising 25% hemp and 75% of at least one further material selected from a natural or synthetic fiber wherein said fibers are combined in an air-laid process and bonded through air bonding at 150° C. for 2 minutes. Such a process includes combining the hemp-based fibers with the synthetic fiber, air laying the hemp fiber with the synthetic fiber, and applying heat to bind the materials together. Through air bonding involves the application of heated air to the surface of the nonwoven fabric. During this air bonding process, heated air flows through holes in a plenum above the nonwoven material. Unlike ovens, which push air through the material, the through air bonding uses negative pressure of suction to pull air through an open apron holding the nonwoven material. This allows for rapid and even transmission of heat to minimize the distortion of the nonwoven material.

A further preferred embodiment is directed toward a nonwoven material comprising 50% hemp and 50% of at least one further material selected from a natural or synthetic fiber wherein said fibers are combined in an air-laid process and bonded through air bonding at 150° C.

A further preferred embodiment is directed toward a nonwoven material comprising 75% hemp and 25% of at least one further material selected from a natural or synthetic fiber wherein said fibers are combined in an air-laid process and bonded through air bonding at 150° C. In preferred embodiments, the 150° C. is held for up to 2 minutes.

A further preferred embodiment is directed toward a nonwoven material comprising 95% hemp and 5% of at least one further material selected from a natural or synthetic fiber wherein said fibers are combined in an air-laid process and bonded through air bonding at 150° C. for two minutes.

A further preferred embodiment is directed toward a nonwoven material comprising more than 95% hemp and 5% or less of at least one further material selected from a natural or synthetic fiber wherein said fibers are combined in an air-laid process and bonded through air bonding at 150° C. for two minutes.

In the above preferred embodiments, the further material is a natural or synthetic fiber, with natural fibers selected from the group consisting of flax, sisal, jute, coconut, grass, straw, wool, and the like. Synthetic fibers include fibers having a high or low melt temperature. Relatively high melt temperature fibers include polyethylene fibers, polypropylene fibers, bicomponent fibers, polyester fibers, polycarbonate fibers, polyamide fibers, rayon fibers, polyvinyl alcohol fibers, polyvinyl acetate fibers, polyacrylonitrile fibers, polylactic acid fibers, carbon fibers, and the like. Preferably, the relatively high melt temperature fibers are polyester fibers, particularly polyethylene terephthalate fibers, or olefin fibers or bicomponent fibers. The fibers may be virgin fibers, fibers obtained as recyclable products from textile and/or carpet manufacture, or any other source. The relatively high melt temperature fibers may be crimped, as disclosed in U.S. Pat. No. 5,779,782, herein incorporated by reference. The high melt temperature fibers may comprise up to 80 weight % of total synthetic fibers, more preferably up to 60 weight %, and most preferably from 0 weight % to 50 weight %, with each percentage from 0 weight % to 80 weight % considered as individually disclosed herein.

With regard to low melt synthetic fibers, it is preferable that the core be polyester and the sheath be polyolefin, preferably polyethylene or polypropylene (including copolymeric polyethylene polymers and polypropylene polymers), and most preferably polyethylene homo- or copolymers. While the terms "core" and "sheath" are used to describe the bicomponent fibers herein, these terms also include bicomponent fibers having an incomplete sheath, including bicomponent fibers where a strand of high melt temperature polymer abuts, continuously or discontinuously, a strand of low melt temperature polymer. The important consideration is that the bicomponent fiber be an integral fiber containing both polymers, regardless of physical arrangement, so long as the low temperature polymer is not completely surrounded or obscured by the high temperature polymer. By the term "high melt temperature" is meant a melt temperature such that the core of the fiber does not melt and thus lose its integrity under mat consolidation conditions. Some softening of the core is allowable. By "low melt temperature" is meant a temperature at which the sheath polymer softens and/or melts to the degree necessary to bind the natural fibers and other constituents of the mat together. The preferred bicomponent fibers are bicomponent fibers available from Leigh Fibers, having a low temperature sheath melting at about 110° C., and a core which melts at 500° F. (260° C.) or higher. However, other bicomponent fibers are commercially available and useful as well.

Core/sheath bicomponent fibers may be supplied with a concentric or eccentric core; the latter, as well as noncore/sheath bicomponent fibers, e.g. those having a side-by-side morphology, are useful in providing a product with greater loft while employing the same amounts of raw materials. Bicomponent fibers with polyester core and sheaths of polyethylene, linear low density polyethylene, and copolyester are available, as are also bicomponent fibers with a polypropylene core and polyethylene sheath. Bicomponent fibers with a polyamide core are also available. Copolyester sheaths generally have melting points in the range of 130° C. to 220° C., while polyethylene sheaths range from about 90° C. to 130° C. Polypropylene in core products generally melts at about 175° C., while polyester cores may melt from 200° C. to 250° C. or higher. Bicomponent polyamide fibers are also available with a polyamide 6,6 core (m.p. 260° C.) and polyamide 6 sheath (m.p. 220° C.). Core/sheath ratios of bicomponent fibers may range from 20:80 to 80:20 by weight, more preferably 60:40 to 40:60, and generally about 50:50.

The melting point of a sheath polymer or core polymer is dependent, of course, on its chemical makeup, and partially dependent on its molecular weight. Thus, lower molecular weight and to some degree oligomeric products tend to have lower melting points, while incorporation of comonomers, such as 1-butene and 1-octene in polyethylene, generally also lower the melting point. For "homopolyesters," polyethylene terephthalate (PET) has a lower melting point than polyethylene naphthalate (PEN). Many combinations are possible, and commercially available. Bicomponent fibers are also available from Fiber Innovation Technology, Inc., Johnson City, IN, and ES FiberVisions, Inc., Athens, GA. The bicomponent fibers comprise minimally 5 weight % of the total weight of all synthetic fibers, preferably minimally 10 weight %, more preferably minimally 15 weight %, and may comprise any weight percentage up to 100 weight % of total synthetic fibers, each percentage between 5 weight % and 100 weight % considered herein as individually disclosed. It is particularly preferred that the bicomponent fibers comprise from 60%-100% of the total synthetic fiber content, more preferably 70%-100%, yet more preferably 80%-100%, and most preferably 90%-100%. Most particularly, all synthetic fibers are bicomponent fibers.

Relatively low melt temperature fibers are preferably polyolefin homopolymers and copolymers, for example polyethylene fibers and polypropylene fibers, which are preferred. The relatively low melt synthetic fibers may comprise the remainder of the nonbicomponent fibers, but preferably constitute no more than 95% by weight of the total synthetic fiber content, more preferably less than 90% by weight, and most preferably about 85% by weight when both bicomponent and nonbicomponent fibers are employed.

The particular core and fiber utilized is important for the temperature at which the fibers are bound and spun. The preferred method utilizes an air bonding process that includes a 150° C. temperature for two minutes. Accordingly, low melt temperature fibers, as described above, having an outer or inner core that will melt or soften at below 150° C. within two minutes time, will result in increased binding of the fibers to the hemp material.

By contrast, fibers that have a higher melt temperature than 150° C. will respond differently than the low melt temperatures. For example, use of a high melt core, where the core will not soften or melt at 150° C. for two minutes, but an outer sheath that will soften in the two minutes at 150° C., will allow for a moderate combination of materials.

Those of skill in the art will know how to select a suitable fiber-based on the needs to the material and its intended purposes. Furthermore, those of skill in the art can modify the melt temperature for thermal bonding the nonwoven material, for example modifying the temperature up or down. Other properties may increase or decrease the time of the heating process.

In a preferred embodiment, the hemp fiber and/or an additional fiber may be imparted with chemical materials. For example, a number of natural oils, minerals, and salts are known to prevent or reduce the growth of bacteria and fungi, or are significantly hydrophobic, or conversely hydrophilic. Other materials are fire retardant. Accordingly, because of the natural proclivity of the hemp fiber to absorb material; in the process of adding a solvent to the fiber, these materials may be added to the hemp fiber, and impregnate the fiber with such materials.

In certain embodiments, the nonwoven material comprises a second fiber, and that second fiber can be impregnated with the same material, or a different material. Accordingly, the nonwoven material can have a variety of additional materials impregnated into the fibers to produce certain effects.

Those of skill in the art will recognize that the nonwoven fibers possess unique properties that can be further improved in some cases, through combinations with additional fibers or materials, as described by the embodiments herein.

What is claimed is:

1. A hemp based nonwoven material comprising between 1 and 100% by weight of hemp fibers and a second fiber comprising between 1 and 99% total weight of the nonwoven material, the second fiber comprising a low melt temperature polymer core and an incomplete high melt temperature polymer sheath, wherein the sheath discontinuously abuts the core, and the core is not completely surrounded by the sheath; wherein the hemp fibers have a different absorbent property than the second fiber, and wherein the hemp fibers are impregnated with a first material and the second fiber is impregnated with a second material, wherein said hemp fibers are saturated with a solvent and blended; wherein said solvent and fibers are filtered; and wherein the fibers can be processed into nonwoven materials via air-laid, carding, and wet-laid, and bonded via hydroentanglement, needle punching, or adhesive bonding.

2. The hemp based nonwoven material of claim 1, wherein said second fiber has a melt point between 100° C. and 200° C.

3. The hemp based nonwoven material of claim 1, wherein the second fiber is selected from the group consisting of: polyester, nylon, polyethylene, polypropylene, cotton, flax, jute, ramie, and other fibrous materials, or combinations thereof.

4. The hemp based nonwoven material of claim 1 with a basis weight of 1 to 1000 grams per square meter.

5. The hemp based nonwoven material of claim 1, wherein the material comprises a liquid absorptive capacity of at least 900%.

6. The hemp based nonwoven material of claim 1, wherein the material comprises a sound absorptive coefficient of at least 0.10 for frequencies above 1000 Hz.

7. The hemp based nonwoven material of claim 1, wherein the core is a polyester and the sheath is a polyolefin.

8. The hemp based nonwoven material of claim 1, wherein the nonwoven material is impregnated with a third component.

9. The hemp based nonwoven material of claim 8, wherein the third component is a natural or synthetic material having antibacterial properties.

* * * * *